(12) United States Patent
Huang et al.

(10) Patent No.: US 12,723,909 B2
(45) Date of Patent: Sep. 1, 2026

(54) INTEGRATED HIGH-PRECISION WEIGHING MODULE

(71) Applicants: Mettler-Toledo (Changzhou) Precision Instruments Ltd., Changzhou (CN); Mettler-Toledo (Changzhou) Measurement Technology Ltd., Changzhou (CN); Mettler-Toledo International Trading (Shanghai) Co., Ltd., Shanghai (CN)

(72) Inventors: Dandan Huang, Changzhou (CN); Chunhui Li, Changzhou (CN); Hu Ding, Changzhou (CN); Lei Xu, Changzhou (CN); Yujun Xu, Changzhou (CN); Xudong Yuan, Changzhou (CN); Yanbo Liu, Changzhou (CN); Yifan Fan, Changzhou (CN); Chenggang Ding, Changzhou (CN)

(73) Assignees: Mettler-Toledo (Changzhou) Precision Instruments Ltd., Changzhou (CN); Mettler-Toledo (Changzhou) Measurement Technology Ltd., Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 327 days.

(21) Appl. No.: 18/567,557

(22) PCT Filed: Jul. 29, 2022

(86) PCT No.: PCT/CN2022/108816
§ 371 (c)(1),
(2) Date: Dec. 6, 2023

(87) PCT Pub. No.: WO2023/006053
PCT Pub. Date: Feb. 2, 2023

(65) Prior Publication Data

US 2024/0263992 A1 Aug. 8, 2024

(30) Foreign Application Priority Data

Jul. 29, 2021 (CN) ......................... 202110865162.1

(51) Int. Cl.
*G01G 23/01* (2006.01)
*G01G 7/02* (2006.01)

(52) U.S. Cl.
CPC ............. *G01G 23/012* (2013.01); *G01G 7/02* (2013.01)

(58) Field of Classification Search
CPC ............................... G01G 23/012; G01G 7/02
(Continued)

(56) References Cited

U.S. PATENT DOCUMENTS 4,425,975 A 1/1984 Lüchinger
5,020,357 A * 6/1991 Kovacevic .............. G01L 25/00 248/419

(Continued)

*Primary Examiner* — John E Breene
(74) *Attorney, Agent, or Firm* — Standley Law Group LLP; Jeffrey S. Standley; Adam J. Smith

(57) ABSTRACT

An integrated high-precision weighing module is provided which includes a scale pan, a lever, an internal calibration system, a bottom plate assembly, and a sensor main body. The scale pan is mounted on the lever, and the lever is connected to the sensor main body. The internal calibration system, the sensor main body, and the lever are arranged transversely, and the internal calibration system and the sensor main body are respectively attached to the bottom plate assembly.

15 Claims, 5 Drawing Sheets

(58) Field of Classification Search
USPC .............................................................. 177/5
See application file for complete search history.

(56) References Cited

U.S. PATENT DOCUMENTS

| | | | | |
|---|---|---|---|---|
| 5,866,854 | A | 2/1999 | Emery et al. | |
| 6,232,567 | B1 * | 5/2001 | Bonino et al. | G01G 3/14 |
| 6,958,453 | B2 * | 10/2005 | Burkhard | G01G 23/005 177/187 |
| 7,317,167 | B2 * | 1/2008 | Burkhard | G01G 23/005 177/187 |
| 7,361,852 | B2 * | 4/2008 | Leahy | G01G 21/06 177/229 |
| 7,513,139 | B2 * | 4/2009 | Genoud et al. | G01G 23/01 |
| 11,703,375 | B2 * | 7/2023 | Reinerst et al. | G01G 23/012 |
| 11,733,084 | B2 * | 8/2023 | Huang | G01G 21/02 177/210 EM |
| 11,933,663 | B2 * | 3/2024 | Liu | G01G 23/012 |
| 11,959,934 | B2 * | 4/2024 | Xu | G01N 5/045 |
| 12,209,976 | B2 * | 1/2025 | Düppre | G01G 11/003 |
| 2021/0199491 | A1 | 7/2021 | Liu et al. | |

* cited by examiner

INTEGRATED HIGH-PRECISION WEIGHING MODULE

BACKGROUND OF THE INVENTION

Technical Field

The present invention relates to the field of weighing modules, and in particular to an integrated high-precision weighing module.

Background Art

Strain sensors and electromagnetic force sensors are the most commonly used type of sensors. However, at present only an electromagnetic force sensor is provided with an internal calibration system, whereas a strain sensor is not provided with an integrated internal calibration system. Hence, the strain sensor has poor long-term reliability, due to the lack of an integrated internal calibration system. But, the strain sensor has an advantage of being slender and narrow, while the electromagnetic force sensor is usually wide and square in dimension. Also, if a module of the electromagnetic force technology is integrated with an internal calibration system, then the internal calibration weight is usually arranged in a width direction, which will result in a large width.

For example, in some of the known prior art, an internal calibration weight is arranged on the left/right side of an elastic body. Although, some of the internal calibration weights are arranged transversely, they are still perpendicular to the elastic bodies.

At present, an electromagnetic force sensor module has a high-precision performance, but has weak overload resistance capability that is usually 1.5 times the capacity. This structure cannot meet the actual needs of customers and has poor reliability. In addition, the weighing module of the electromagnetic force sensor technology has high cost.

Especially with the development of smart technologies, customers have increasingly high requirements for automation, requiring compact type products which can be accommodated in a small area. Small packaged bags, such as Chinese patent medicines and coffee packets, are the main application scenarios, in which it is very difficult to install and maintain the weighing module in a small area.

In view of this, the inventor of the present invention has designed an integrated high-precision weighing module in order to overcome the above technical problems.

SUMMARY

The present invention provides an integrated high-precision weighing module in order to overcome the defects in the prior art, where an electromagnetic force sensor has weak overload resistance capacity, poor reliability, and high cost, and a strain sensor is not provided with an integrated internal calibration system.

The present invention solves the above technical problem through the following technical solution: an integrated high-precision weighing module comprising a scale pan, a lever, an internal calibration system, a bottom plate assembly, and a sensor main body, characterized in that the scale pan is mounted on the lever, and the lever is connected to the sensor main body; wherein the internal calibration system, the sensor main body, and the lever are arranged transversely; wherein the internal calibration system and the sensor main body are attached to the bottom plate assembly.

According to an embodiment of the present invention, the internal calibration system comprises an internal calibration weight, a mounting base plate, a support having two ends, and an electric motor; wherein the electric motor and the support are attached to the mounting base plate, and each of the two ends of the support is respectively provided with a support rod, wherein the internal calibration weight is mountable on the support through the support rods.

According to an embodiment of the present invention, the support comprises a tapered-surface support portion, wherein a bottom surface of one of the end portions of the internal calibration weight is in contact with the tapered-surface support portion.

According to an embodiment of the present invention, each of the two end portions of the internal calibration weight comprises a through-hole, wherein the support rods of the support pass through the corresponding through-holes of the internal calibration weight.

According to an embodiment of the present invention, the lever comprises a lever main body and a calibration weight support arm, wherein the lever main body is connected to the sensor main body, and the calibration weight support arm is mounted at one end of the lever main body for supporting the internal calibration weight.

According to an embodiment of the present invention, the calibration weight support arm is a supporting plate, an upper surface of the supporting plate comprises a recess, and the internal calibration weight is receivable in the recess.

According to an embodiment of the present invention, the recess is a V-shaped recess, and an upper surface of the V-shaped recess and an arc-shaped surface of the internal calibration weight are in contact with each other.

According to an embodiment of the present invention, the bottom plate assembly comprises a bottom plate and a digital circuit board, wherein the digital circuit board is mounted inside the bottom plate; wherein the sensor main body and the mounting base plate of the internal calibration system are attached to the bottom plate, wherein the bottom plate assemble further comprises a limiting member mounted between the bottom plate and the sensor main body, and a gap is formed and maintained between the sensor main body and the bottom plate.

According to an embodiment of the present invention, the limiting member is an unloading screw.

According to an embodiment of the present invention, the integrated high-precision weighing module further comprises a housing and a cable, wherein the internal calibration system, the lever, and the sensor main body are enclosed between the housing and the bottom plate, and the integrated high-precision weighing module is connectable to an external control system by means of the cable.

According to an embodiment of the present invention, the scale pan is a labyrinth-ring type scale pan.

The integrated high-precision weighing module of the present invention has the following advantages:

1. Structure: The weighing module has less number of parts, smaller in size, easy to manufacture, and the internal calibration system and a weighing unit can be implemented with one lever;
2. Cost: The weighing module has a great cost advantage over existing products; and
3. Features: Additional features such as the internal calibration system, being highly dustproof and waterproof, easy to clean, and the weighing module can ensure long-term reliability of the product and is easy for customers to operate.

BRIEF DESCRIPTION OF THE DRAWINGS

The above features, properties and advantages of the present invention will become clearer based on the description below in conjunction with the accompanying drawings and embodiments, and the same features are denoted by the same reference numerals throughout the figures, in which.

BRIEF DESCRIPTION OF THE DRAWINGS

Figure 1:
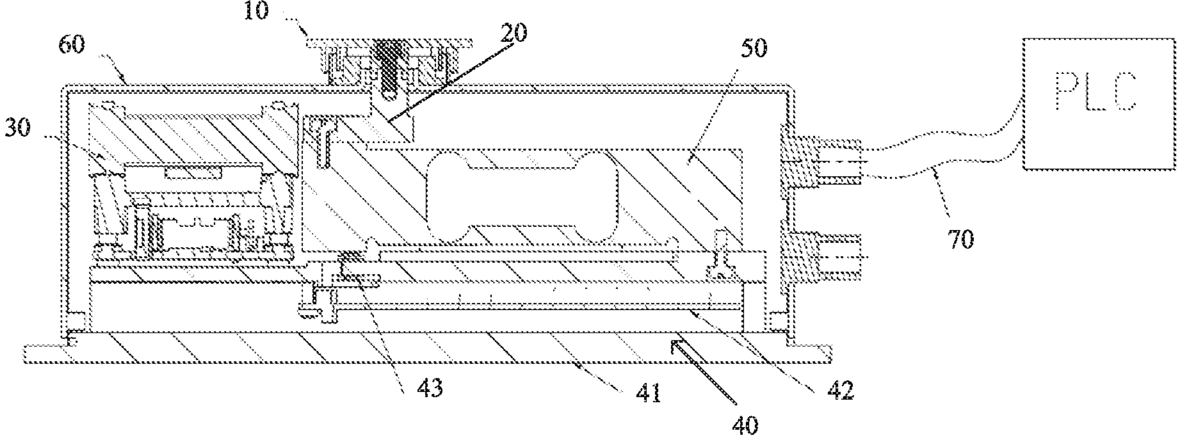
FIG. 1 is a schematic structural diagram of an integrated high-precision weighing module of the present invention

To make the above objectives, features, and advantages of the present invention more apparent and easier to understand, specific implementations of the present invention will be described in detail below in conjunction with the accompanying drawings.

Embodiments of the present invention will now be described in detail with reference to the accompanying drawings. Reference will now be made in detail to preferred embodiments of the present invention, examples of which are illustrated in the accompanying drawings. The same reference numerals used in all the accompanying drawings denote identical or similar parts wherever possible.

Furthermore, although the terms used in the present invention are selected from well-known common terms, some of the terms mentioned in the description of the present invention may have been selected by the applicant according to his or her determination, and the detailed meaning thereof is described in the relevant section described herein.

Furthermore, the present invention must be understood, not simply by the actual terms used but also by the meanings encompassed by each term.

Figure 2:
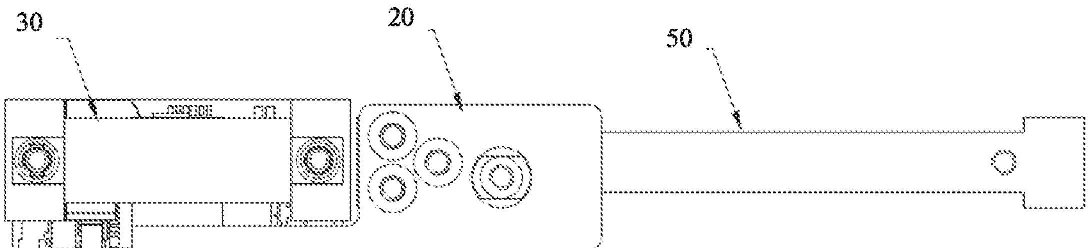
FIG. 2 is a top view of an internal structure of the integrated high-precision weighing module of the present invention

FIG. 1 is a schematic structural diagram of an integrated high-precision weighing module of the present invention. FIG. 2 is a top view of an internal structure of the integrated high-precision weighing module of the present invention.

As shown in FIG. 1 and FIG. 2, the present invention discloses an integrated high-precision weighing module. The integrated high-precision weighing module comprises a scale pan 10, a lever 20, an internal calibration system 30, a bottom plate assembly 40, and a sensor main body 50. The scale pan 10 is mounted on the lever 20, and the lever 20 is connected to the sensor main body 50. The internal calibration system 30, the sensor main body 50, and the lever 20 are arranged transversely, forming a compact arrangement with an overall smaller width. Furthermore, the internal calibration system 30 and the sensor main body 50 are respectively attached to the bottom plate assembly 40.

Preferably, the integrated high-precision weighing module further comprises a housing 60 and a cable 70. The internal calibration system 30, the lever 20, and the sensor main body 50 are enclosed between the housing 60 and the bottom plate assembly 40, and the integrated high-precision weighing module is connected to an external control system, for example, an external PLC terminal, by means of the cable 70. Here, the scale pan 10 is preferably a labyrinth-ring type scale pan.

Further preferably, the scale pan 10 is connected to the lever 20 by means of a screw, the lever 20 is connected to the sensor main body 50 by means of three screws, and the internal calibration system 30 and the sensor main body 50 are both connected to the bottom plate assembly 40 by means of screws. Finally, the entire sensor in combination with the internal calibration system 30 is enclosed in the housing 60 to form the weighing module, and the entire module is connected to the PLC terminal of a customer by means of the cable 70.

According to the integrated high-precision weighing module of the present invention, main load transferring components (the scale pan 10 and the lever 20) are arranged transversely to reduce the size. While performing internal calibration, the customer will reset to factory parameter settings by loading and unloading the internal calibration weight. During loading and unloading the internal calibration weight, the arm of force is lengthened due to the transverse arrangement, resulting in higher requirement for positioning of the internal calibration weight in the internal calibration system 30.

Figure 3:
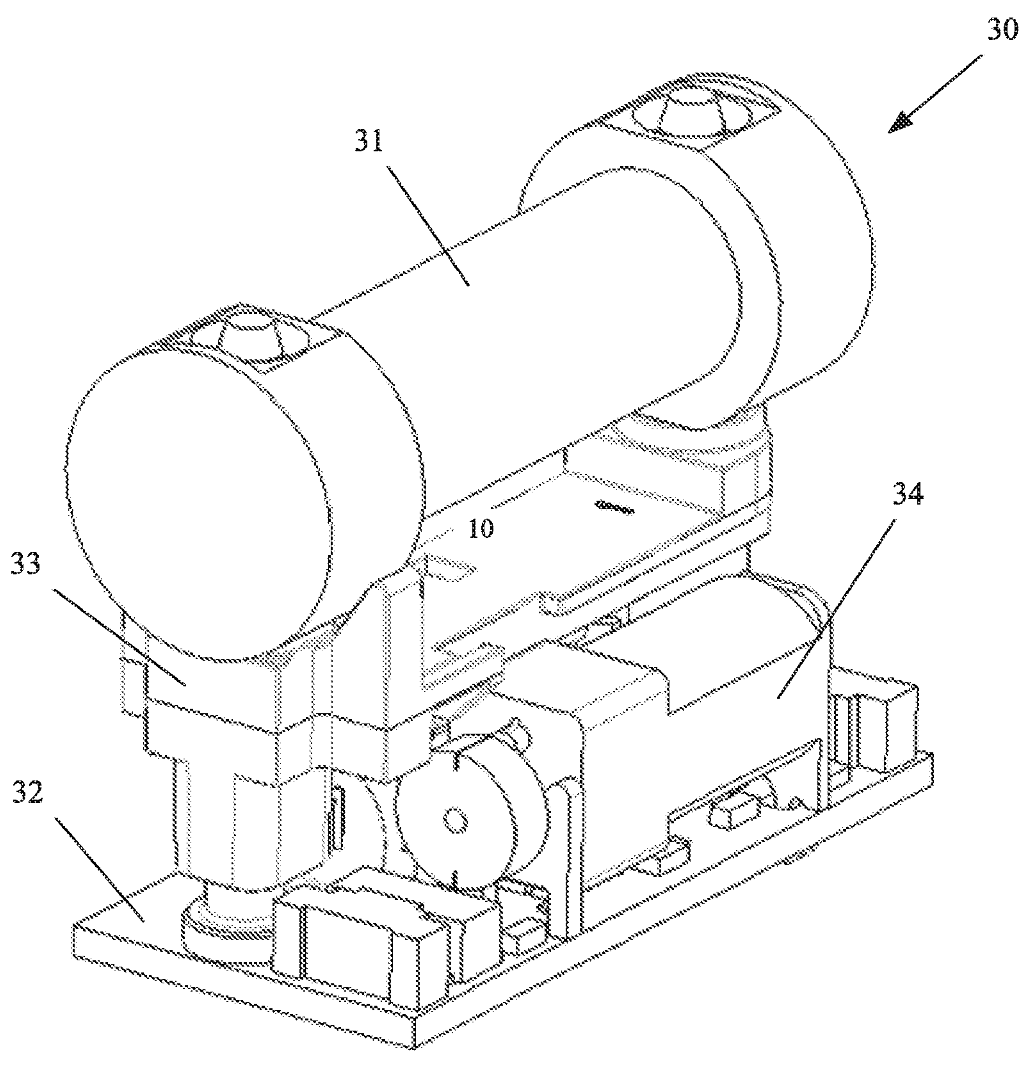
FIG. 3 is a perspective view of an internal calibration system in the integrated high-precision weighing module of the present invention
Figure 4:
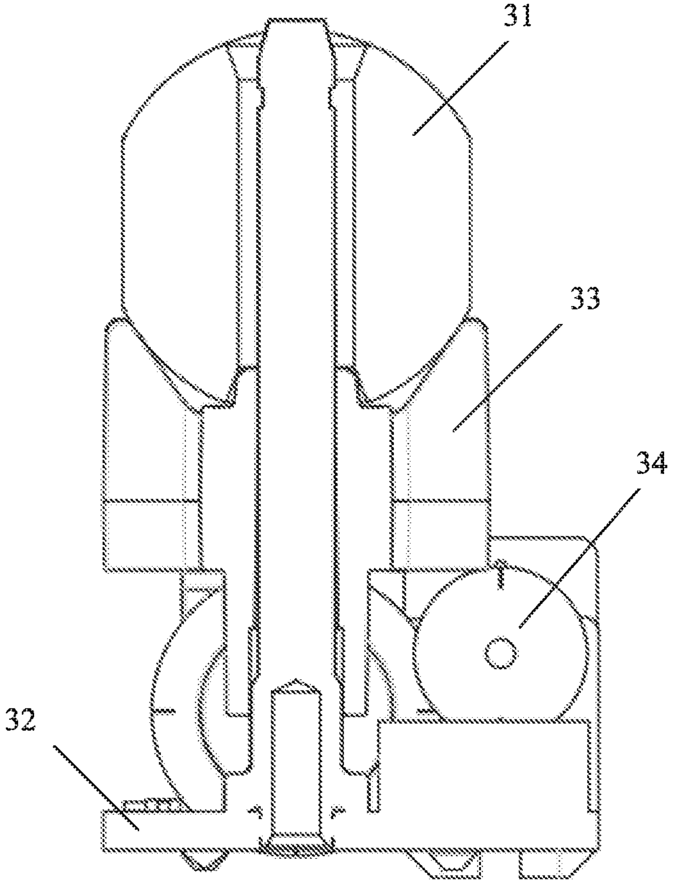
FIG. 4 is a side view of the internal calibration system in the integrated high-precision weighing module of the present invention
Figure 5:
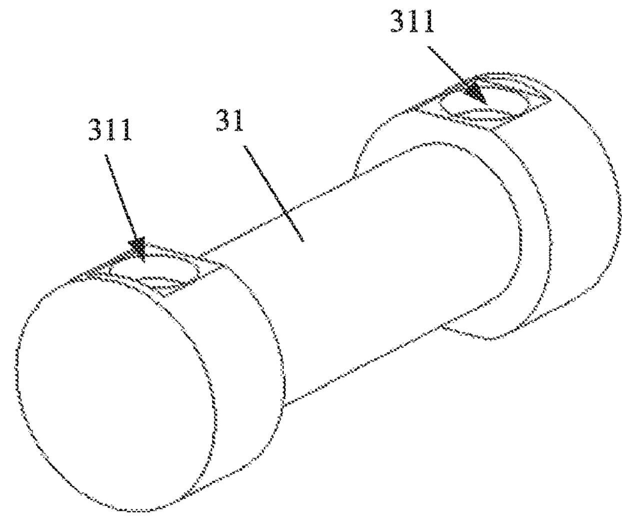
FIG. 5 is a perspective view of an internal calibration weight in the integrated high-precision weighing module of the present invention
Figure 6:
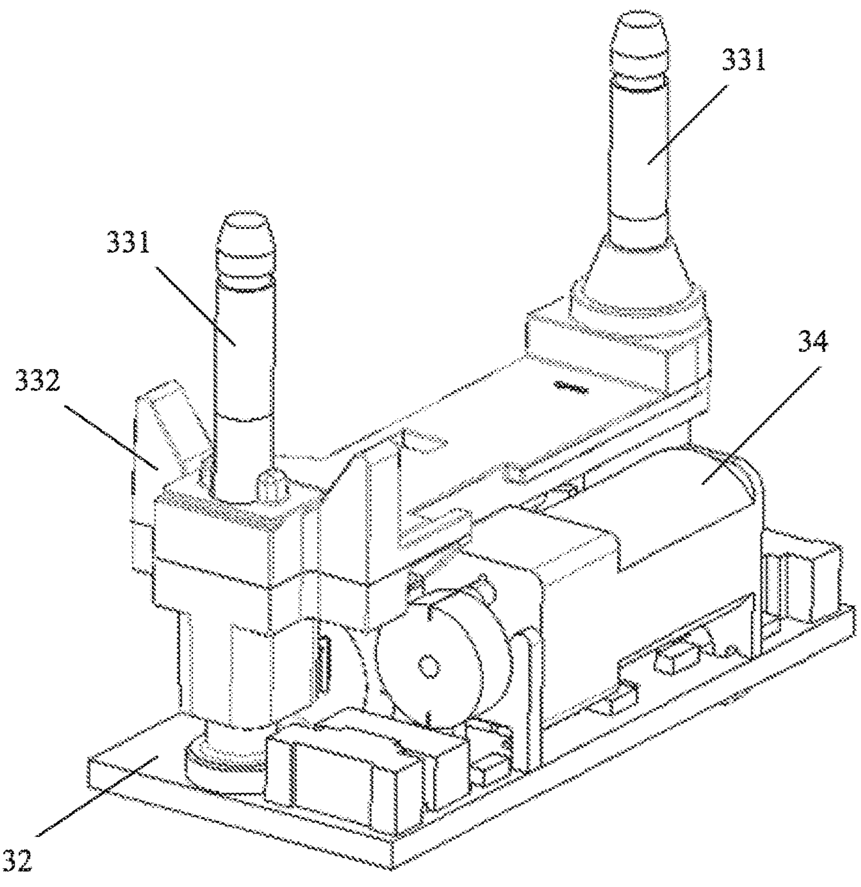
FIG. 6 is a schematic structural diagram of the internal calibration system in the integrated high-precision weighing module of the present invention with the internal calibration weight removed

FIG. 3 is a perspective view of an internal calibration system in the integrated high-precision weighing module of the present invention. FIG. 4 is a side view of the internal calibration system in the integrated high-precision weighing module of the present invention. FIG. 5 is a perspective view of an internal calibration weight in the integrated high-precision weighing module of the present invention. FIG. 6 is a schematic structural diagram of the internal calibration system in the integrated high-precision weighing module of the present invention with the internal calibration weight removed.

As shown in FIG. 3 to FIG. 6, the internal calibration system 30 preferably comprises an internal calibration weight 31 having two end portions, a mounting base plate 32, a support 33 having two ends, and an electric motor 34. The electric motor 34 and the support 33 are attached to the mounting base plate 32, and each of the two ends of the support 33 is respectively provided with a support rod 331, and the internal calibration weight 31 is mountable on the support 33 through the support rods 331.

Preferably, the support 33 is provided with a tapered-surface support portion 332, and a bottom surface of one of the end portions of the internal calibration weight 31 is in contact with the tapered-surface support portion 332.

Further, each of the two ends of the internal calibration weight 31 are provided with a through-hole 311, and the support rods 331 of the support 33 pass through the corresponding through-holes 311 of the internal calibration weight 31.

It is necessary to ensure consistency while raising and lowering the internal calibration weight 31 of the internal calibration system 30. In the internal calibration system 30, a double-rod positioning mode is designed between the electric motor 34 and the internal calibration weight 31. In a front-and-rear direction, one of the support rods 331 is in contact with a weight tapered surface; in a left-and-right direction, the other one of the support rods 331 is in contact with a tapered surface of the internal calibration weight 31, so that the consistency in position of the internal calibration weight 31 driven by the electric motor 34 while raising and lowering can be ensured.

Figure 7:
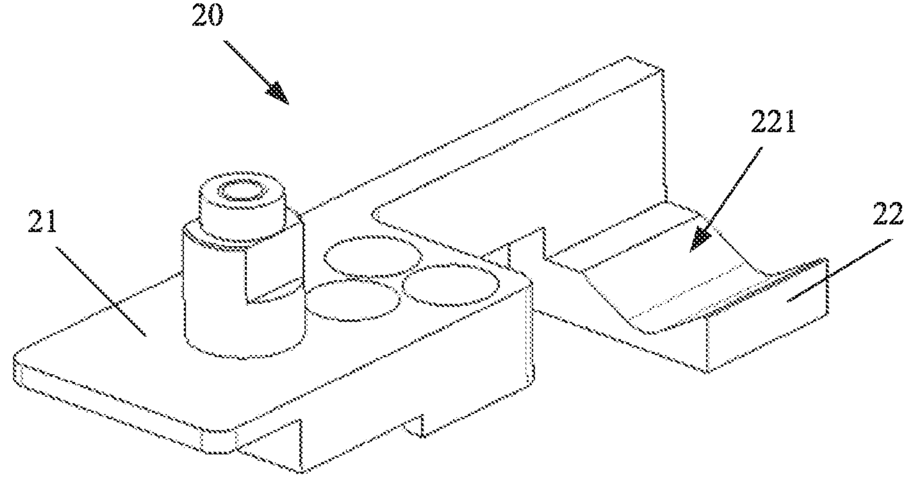
FIG. 7 is a perspective view of a lever in the integrated high-precision weighing module of the present invention
Figure 8:
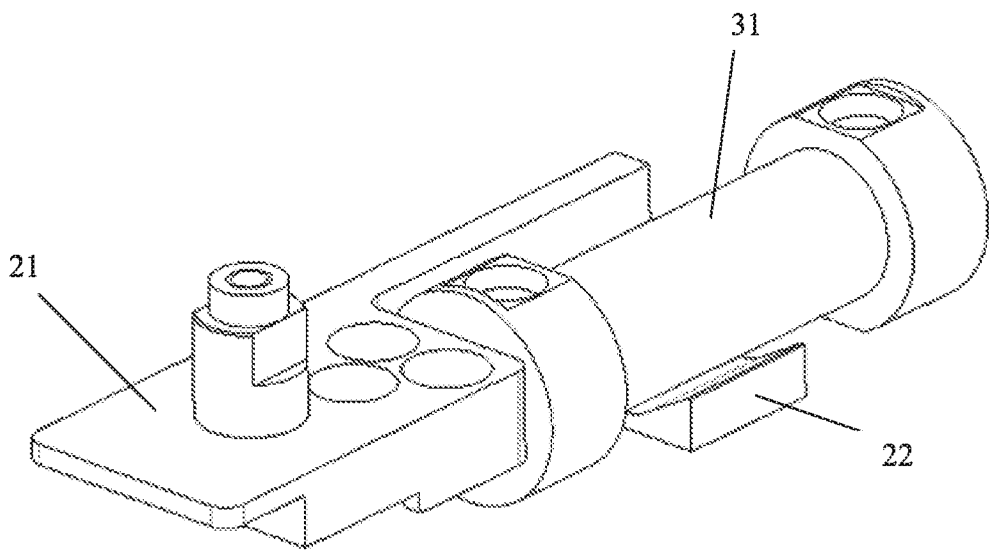
FIG. 8 is a schematic diagram showing installation of the lever and the internal calibration weight in the integrated high-precision weighing module of the present invention

FIG. 7 is a perspective view of a lever in the integrated high-precision weighing module of the present invention. FIG. 8 is a schematic diagram showing installation of the lever and the internal calibration weight in the integrated high-precision weighing module of the present invention.

As shown in FIG. 7 and FIG. 8, the lever 20 comprises a lever main body 21 and a calibration weight support arm 22. The lever main body 21 is connected to the sensor main body 50, and the calibration weight support arm 22 is mounted at one end of the lever main body 21 for supporting the internal calibration weight 31.

Preferably, the calibration weight support arm 22 is a supporting plate, and an upper surface of the supporting plate is provided with a recess 221, and the internal calibration weight 31 is receivable in the recess 221, wherein the recess 221 is a V-shaped recess. An upper surface of the V-shaped recess 221 and an arc-shaped bottom surface of the internal calibration weight 31 are in contact with each other.

In the integrated high-precision weighing module, the lever 20 and the scale pan 10 are connected to each other by means of a screw. During loading or unloading, only the internal calibration weight 31 and the scale pan 10 are directly subjected to a lever calculation, and the lever 20 is provided with a widened calibration support arm to support the weight.

In the prior art, two arms are usually used for supporting the calibration weight. If the design of the two arms is manufactured by machining, firstly, the cost will be high, and secondly, it can cause deformation during material removing easily. Additionally, it is difficult to ensure the depth of parallelism of the two arms, and if the two arms are welded, it is even more difficult to ensure the depth of parallelism of the two arms, thereby resulting in inconsistency in position of the calibration weight when raising or lowering every time during loading or unloading, which will directly increase calibration errors. Therefore, according to the integrated high-precision weighing module, the internal calibration weight 31 is placed in the recess 221 which is V-shaped, and the contact between the upper surface of the V-shaped recess 221 and the arc-shaped bottom surface of the internal calibration weight 31 makes the internal calibration weight 31 more stable when it is lowered.

In addition, the bottom plate assembly 40 preferably comprises a bottom plate 41 and a digital circuit board 42. The digital circuit board 42 is mounted inside the bottom plate 41. The sensor main body 50 and the mounting base plate 32 of the internal calibration system 30 are attached to the bottom plate 41, and the bottom plate assembly 40 is provided with a limiting member 43, which is mounted between the bottom plate 41 and under the sensor main body 50, and a gap is formed and maintained between the sensor main body 50 and the bottom plate 41. The limiting member 43 is preferably an unloading screw.

In the integrated high-precision weighing module of the present invention, the internal calibration system 30 and the sensor main body 50 are arranged transversely, thereby reducing the width of the entire module. The lever 20 and the internal calibration weight 31 are in contact with each other by means of a V-shaped recess and a curved surface of the internal calibration weight 31, thereby ensuring a high positioning precision of the internal calibration weight, and ensuring the weighing performance.

By the means of an unloading screw and a gap designed between the sensor main body 50 and the bottom plate 41, protection of vertical limiting is achieved, and with the unloading screw, the cost can also be reduced and the reliability can be ensured.

According to the integrated high-precision weighing module, both the precision and high reliability can be ensured by using the strain-type technology integrated with the internal calibration system 30, thereby reducing the cost in the high-precision module market and having a higher competitive advantage.

According to the above structural description of the present invention, for solving the problems encountered in the design of the existing small-capacity high-precision weighing module, and for overcoming difficulties in the design of the weighing module, a weighing module based on the strain technology and integrated with the internal calibration system is designed, thereby achieving the purpose of improving the weighing performance and weighing reliability of the small-capacity high-precision weighing module.

The integrated high-precision weighing module can realize the following functions:

1. based on the strain sensor technology and integrated with the internal calibration system: in a long-term maintenance process, the performance of the module can be checked by means of the internal calibration system, thereby improving the precision and long-term reliability of the product;
2. compact size: equipment space requirement at customer site is reduced, production efficiency is improved, and easy installation and maintenance are facilitated for customers;
3. mechanical performance protection: the vertical limiting design ensures a more reliable overload protection capability; and
4. low cost: providing greater profit margins for the high-precision modules and ensuring price advantages over the high-precision modules integrated with the internal calibration systems available on the market with electromagnetic force sensors, which have higher costs.

According to the integrated high-precision weighing module, the reliability of the entire internal calibration system is significantly improved by means of the design of a positioning system between the lever, the internal calibration weight, and the electric motor.

In summary, the integrated high-precision weighing module of the present invention has the following advantages:

1. Structure: the weighing module has a less number of parts, smaller in size, and is easy to manufacture, and the internal calibration system and a weighing unit can be implemented with one lever;
2. Cost: the weighing module has a great cost advantage over existing products; and
3. Features: Additional features such as the internal calibration system, being highly dustproof and waterproof, easy to clean, and the weighing module can ensure long-term reliability of the product and is easy for customers to operate.

Although specific implementations of the present invention have been described above, those skilled in the art should understand that these are merely examples, and the scope of protection of the present invention is defined by the appended claims. Various alterations or modifications to these implementations can be made by those skilled in the art without departing from the principle and essence of the present invention. However, these alterations and modifications all fall within the scope of protection of the present invention.

REFERENCE SIGNS LIST

Scale pan 10
Lever 20
Internal calibration system 30
Bottom plate assembly 40
Sensor main body 50
Housing 60
Cable 70
Internal calibration weight 31
Mounting base plate 32
Support 33
Electric motor 34
Support rod 331
Tapered-surface support portion 332
Through-hole 311
Lever main body 21
Calibration weight support arm 22
Recess 221
Bottom plate 41
Digital circuit board 42
Limiting member 43

The invention claimed is:

1. An integrated high-precision weighing module, said module comprising:
- a scale pan;
- a lever;
- an internal calibration system;
- a bottom plate assembly; and
- a sensor main body;

wherein:
- the scale pan is mounted on the lever, said lever is connected to the sensor main body;
- the internal calibration system, the sensor main body, and the lever are arranged transversely; and
- the internal calibration system and the sensor main body are attached to the bottom plate assembly.

2. The module according to claim 1, wherein:
the internal calibration system comprises:
- an internal calibration weight having two end portions;
- a mounting base plate;
- a support having two ends; and
- an electric motor;
- the electric motor and the support are attached to the mounting base plate, and each of the two ends of the support is respectively provided with a support rod; and
- the internal calibration weight is mountable on the support through the support rods.

3. The module according to claim 2, wherein:
the support comprises a tapered-surface support portion; and
a bottom surface of one of the end portions of the internal calibration weight is in contact with the tapered-surface support portion.

4. The module according to claim 3, wherein:
each of the two end portions of the internal calibration weight comprise a through-hole; and
the support rods of the support pass through a corresponding through-holes of the internal calibration weight.

5. The module according to claim 1, wherein:
the lever comprises:
- a lever main body is connected to the sensor main body, and
- a calibration weight support arm is mounted at one end of the lever main body for supporting the internal calibration weight.

6. The module according to claim 5, wherein:
the calibration weigh support arm is a supporting plate;
an upper surface of the supporting plate comprises a recess; and
the internal calibration weight is receivable in the recess.

7. The module according to claim 6, wherein:
the recess is a V-shaped recess; and
an upper surface of the V-shaped recess and an arc-shaped bottom surface of the internal calibration weight are in contact.

8. The module according to claim 2, wherein:
the bottom plate assembly comprises a bottom plate and a digital circuit board;
said digital circuit board is mounted inside the bottom plate;
the sensor main body and the mounting base plate of the internal calibration system are attached to the bottom plate; and
the bottom plate assembly further comprises a limiting member mounted between the bottom plate and the sensor main body; and
a gap is formed and maintained between the sensor main body and the bottom plate.

9. The module according to claim 8, wherein:
the limiting member is an unloading screw.

10. The module according to claim 8, wherein:
the module further comprises a housing (60) and a cable;
the internal calibration system, the lever, and the sensor main body (50) are enclosed between the housing and the bottom plate; and
the module is connectable to an external control system by means of the cable.

11. The module according to claim 1, wherein:
the scale pan is a labyrinth-ring type scale pan.

12. The module according to claim 1, wherein:
the internal calibration system, the sensor main body, and the lever extend longitudinally alongside one another in a same direction.

13. The module according to claim 12, wherein:
the same direction is along a longitudinal axis of the module.

14. An integrated high-precision weighing module, said module comprising:
- a scale pan;
- a lever;
- an internal calibration system;
- a bottom plate assembly; and
- a sensor main body;

wherein:
- the scale pan is mounted on the lever, said lever is connected to the sensor main body;
- the internal calibration system, the sensor main body, and the lever extend alongside one another and along a longitudinal axis of the module; and
- the internal calibration system and the sensor main body are attached to the bottom plate assembly.

15. An integrated high-precision weighing module, said module comprising:
- a scale pan;
- a lever;
- an internal calibration system;
- a bottom plate assembly; and a sensor main body;

wherein:

the scale pan is mounted on the lever, said lever is connected to the sensor main body;

the internal calibration system, the sensor main body, and the lever are arranged transversely such that the internal calibration system, the sensor main body, and the lever extend alongside one another and along a longitudinal axis of the module; and the internal calibration system and the sensor main body are attached to the bottom plate assembly.

* * * * *